(12) United States Patent  
Feng et al.

(10) Patent No.: US 12,263,633 B2  
(45) Date of Patent: Apr. 1, 2025

(54) NYLON TUBE AUTOMATIC THERMOFORMING APPARATUS AND FORMING PROCESS

(71) Applicant: ZHEJIANG BOSHITE GROUP CO., LTD., Zhejiang (CN)

(72) Inventors: Bo Feng, Zhejiang (CN); Longjun He, Zhejiang (CN)

(73) Assignee: ZHEJIANG BOSHITE GROUP CO., LTD., Zhuji (CN)

( * ) Notice: Subject to any disclaimer, the term of this patent is extended or adjusted under 35 U.S.C. 154(b) by 568 days.

(21) Appl. No.: 17/483,803

(22) Filed: Sep. 23, 2021

(65) Prior Publication Data

US 2022/0009149 A1 Jan. 13, 2022

Related U.S. Application Data

(63) Continuation of application No. PCT/CN2020/086621, filed on Apr. 24, 2020.

(30) Foreign Application Priority Data

Dec. 18, 2019 (CN) .......................... 201911311969.X (51) Int. Cl.
*B29C 53/08* (2006.01)
*B29C 51/42* (2006.01)
(Continued)

(52) U.S. Cl.
CPC ............ *B29C 53/08* (2013.01); *B29C 51/427* (2013.01); *B29C 53/005* (2013.01); *B29C 53/84* (2013.01);
(Continued)

(58) Field of Classification Search
CPC ..... B29C 53/08; B29C 51/427; B29C 53/005; B29C 53/84; B29C 53/083
See application file for complete search history.

(56) References Cited

U.S. PATENT DOCUMENTS 6,309,588 B1 10/2001 Powell et al.
2018/0297265 A1 10/2018 Weinhardt et al.

FOREIGN PATENT DOCUMENTS

CN 205380868 U 7/2016
CN 107127959 A 9/2017
(Continued)

OTHER PUBLICATIONS

International Search Report of PCT Patent Application No. PCT/CN2020/086621 issued on Sep. 9, 2020.

*Primary Examiner* — Galen H Hauth
*Assistant Examiner* — John Robitaille (57) ABSTRACT

A nylon tube automatic thermoforming apparatus includes a main body, a conveying assembly, a heating assembly and a tube bending assembly. The heating assembly includes an oven communicated with the conveying assembly and an electrically heated cylinder arranged between the oven and the tube bending assembly. A heating coil is arranged in the electrically heated cylinder. A nylon tube is conveyed from the conveying assembly and enters the tube bending assembly via the oven and the heating coil. The electrically heated cylinder and the tube bending assembly are arranged outside the main body. A nylon tube shaping process includes the steps of drawing, heating inside a main body, heating outside the main body, bending, staying, feeding, angle adjusting, repeating the above steps until the length and the curvature of the nylon tube meet the requirements, and cutting off.

8 Claims, 10 Drawing Sheets

(51) Int. Cl.
*B29C 53/00* (2006.01)
*B29C 53/84* (2006.01)
B29K 77/00 (2006.01)
B29L 23/00 (2006.01)

(52) U.S. Cl.
CPC ..... *B29K 2077/00* (2013.01); *B29L 2023/004* (2013.01)

(56) References Cited

FOREIGN PATENT DOCUMENTS

| | | |
|---|---|---|
| CN | 206605774 U | 11/2017 |
| CN | 107599366 A | 1/2018 |
| CN | 209304982 U | 8/2019 |
| CN | 110948841 A | 4/2020 |
| DE | 102004002539 A1 | 8/2005 |
| JP | H06328555 A | 11/1994 |

NYLON TUBE AUTOMATIC THERMOFORMING APPARATUS AND FORMING PROCESS

CROSS REFERENCE TO RELATED APPLICATIONS

The present application is a continuation of international application of PCT application serial No. PCT/CN2020/086621 filed on Apr. 24, 2020, which claims the priority benefit of China application No. 201911311969.X filed on Dec. 18, 2019. The entirety of each of the above mentioned patent applications is hereby incorporated by reference herein and made a part of this specification.

BACKGROUND

Technical Field

The present application relates to the technical field of nylon tube forming, and in particular, to a nylon tube automatic thermoforming apparatus and a forming process.

Description of Related Art

Shaped bending nylon tubes have been used in automobile industries for a long time. According to actual application requirements, it is often desirable to bend shaped bending nylon tubes into different angles in different directions. The shaped bending nylon tubes in the prior art are usually obtained by the process of first forming and then heating, that is, according to the shape of the nylon tube to be formed, a metal mold with a certain curvature is manufactured, then the unbent nylon tube is placed in the mold, then the mold and the nylon tube are heated together, and finally the mold is cooled, after the mold is opened, the nylon tube is formed into a specific shape. This production process is cumbersome and time consuming, besides, the specific metal mold only be used to form one type of nylon tube and is not universal, causing serious cost waste.

To solve the above problem, an invention with a publication number of CN107127959A discloses an automatic thermoforming apparatus for a shaped nylon tube, which includes an upper loading tray, a feeding guide wheel, a conveying clamp assembly, a conveyor assembly, a heating assembly, a Z-axis motor, a curved wheel component, a rotary arm, a rotary shaft, a motor and a rack. The loading tray is arranged at the right end of the rack table. The conveyor assembly is arranged at the left end of the conveying clamp assembly of the rack. The heating assembly is arranged at the left end of the conveyor assembly. The Z-axis motor is arranged on the side of the heating assembly, a nozzle joint at the left end of the heating assembly is sleeved with a rotary wheel; the rotary wheel and the Z-axis motor are engaged with gears; a panel of the rotary wheel is connected with the rotary arm; a curved wheel component which can rotate is arranged at left end face of the nozzle joint, the lower end of the rotary shaft inside the rotary arm is connected with a curved wheel of the curved wheel assembly; a speed reducer at the lower end of the motor is connected with the rotary shaft.

The above application directly omits mold processing, the production process is fully automated, solving the problems of low production efficiency and cost waste.

However, when the above apparatus is in use, the nylon tube cannot be heated during the process of arriving at the external curved wheel component from the heating assembly. When the nylon tube arrives at the curved wheel component, the temperature is decreased, and therefore, after being bent by the curved wheel component to a predetermined angle and radian, the nylon tube tends to stretch slowly, thereby lowering the bending accuracy.

SUMMARY

Aiming at the disadvantages of the prior art as mentioned above, a first object of the present application is to provide a nylon tube automatic thermoforming apparatus, which has an advantageous effect of high forming accuracy.

The first object of the present application is achieved by the following technical solutions:

There is provided a nylon tube automatic thermoforming apparatus, including a main body, a conveying assembly, a heating assembly and a tube bending assembly. The heating assembly includes an oven communicated with the conveying assembly and an electrically heated cylinder arranged between the oven and the tube bending assembly. A heating coil is arranged in the electrically heated cylinder. A nylon tube is conveyed from the conveying assembly and enters the tube bending assembly via the oven and the heating coil. The electrically heated cylinder and the tube bending assembly are arranged outside the main body. An air cooling system and a cut-off device are arranged outside the tube bending assembly.

By adopting the above technical solution, the nylon tube enters the oven for heating, drawn by the conveying assembly, so that the nylon tube becomes soft, destroys its original structure, and is easy to reform. In order to ensure the sealing property of the oven and avoid heat dissipation, the oven is generally arranged inside the main body and the electrically heated cylinder is arranged outside the main body. As a part of the heating assembly, the electrically heated cylinder can continuously heat the nylon tube outside the main body in the case that the oven does not extend out of the main body, which guarantees the nylon tube is always in a heated state before entering the tube bending assembly, avoids the situation that the nylon tube is cooled and hardened and thus hard to form before being bent, and guarantees that the nylon tube has good forming accuracy.

According to a further arrangement in a preferred embodiment of the present application, the tube bending assembly, which is arranged at an end of the electrically heated cylinder away from the main body, includes a curved wheel component rotatably connected to the electrically heated cylinder, a first driving component driving the curved wheel component to rotate, an elbow component rotatably connected to the curved wheel component, and a second driving component driving the elbow component to rotate relative to the curved wheel component; wherein the curved wheel component includes a rectangular block, a sector block, a limiting block that are integrally connected together, the sector block is arranged at one side of the rectangular block, the limiting block is arranged at the other side of the rectangular block, a bending groove is defined on the sector block along the arc surface, two ends of the bending groove extend to two surfaces of the rectangular block and penetrate through the rectangular block, a matching groove is defined on one side of the limiting block toward the rectangular block, the matching groove and a limiting groove are snap-fitted to form a circular channel, one end of the circular channel away from the sector block directly faces an outlet of the electrically heated cylinder, and is rotationally connected centering about a central axis of the circular channel, and a rotational circle center of the elbow assembly coincides with a circle center of a sector surface of the sector block.

By adopting the above technical solution, after passing through the electrically heated cylinder, the nylon tube extends out from the circular channel. An elbow component is rotated about a circle center of the sector block under the driving of the second driving component, thereby pressing the nylon tube portion extending out of the circular channel into the bending groove. When the nylon tube needs to be bent in different directions to generate radian, a first driving component can be activated to drive the curved wheel component to rotate along the circular channel to a corresponding angle, and then the second driving component is activated again to bend the nylon tube, thereby forming a final desired product, the degree of automation is high, the machining efficiency is high, the bending radians and angles of the nylon tubes are controlled by the machine, and thus the accuracy is high, and the machined products are stable in quality.

According to a further arrangement in a preferred embodiment of the present application, the elbow assembly includes a rotary shaft penetrating through a circle center of the sector block, rotary arms connected to two ends of the rotary shaft and a bending lever connected between the rotary arms, and the second driving component drives the rotary shaft to rotate.

By adopting the above technical solution, the second driving component drives the rotary shaft to rotate, the rotary arm in turn drives the bending lever to rotate centering about the rotary shaft, that is, the bending lever rotates along the bending groove about the circle center of the sector block, the rotation of the bending lever urges the nylon tube protruding from the circular channel to bend and press into the bending groove, and therefore, one bending operation of the nylon tube is achieved, which is convenient in use.

According to a further arrangement in a preferred embodiment of the present application, the first driving component includes a driving disk rotatably connected to the main body, and a cantilever connected to the driving disk, wherein the driving disk is coaxially arranged with the central axis of the electrically heated cylinder, the cantilever is parallel to the electrically heated cylinder, an end of the cantilever away from the main body is connected to the curved wheel component, a first servo motor for driving the driving disk to rotate and a first speed reducer are provided inside the main body.

By adopting the above technical solution, the rotation of the first servo motor is transmitted to the driving disk via a speed reducer. The driving disk drives the cantilever to rotate around the electrically heated cylinder. The cantilever in turn drives the curved wheel component to rotate around the circular channel at a certain angle. Then, the second driving component is activated again to drive the elbow assembly to rotate. The bending direction of the elbow component to the nylon tube is different from the first time. Thus, the purpose of bending the nylon tube in different directions can be achieved.

According to a further arrangement in a preferred embodiment of the present application, the second driving component includes a second servo motor and a second speed reducer arranged on the cantilever, and an output shaft of the second speed reducer and the rotary shaft are connected via a shaft coupling.

By adopting the above technical solution, the rotation of the second servo motor is transmitted to the shaft coupling via a speed reducer. The shaft coupling transmits the rotational movement to the elbow component. The second driving component is arranged on the cantilever, so that the second driving component can change directions along with rotation of the cantilever and the curved wheel component. Due to the arrangement of the shaft coupling, when the diameter of the nylon tube changes, the rotating gap between the second driving component and the rotary shaft can be compensated through the shaft coupling, achieving damage-free bending of the nulon tube, and guaranteeing quality of the nylon tube after bending.

According to a further arrangement in a preferred embodiment of the present application, the air cooling system includes a cooler arranged on the cantilever and a cooling air duct connected to the cooler, wherein, an end portion of the cooling air duct directly faces the bending groove.

By adopting the above technical solution, the cooler generates cool air and blows the cold air to the bending groove through the cooling air duct, and when the nylon tube is pressed into the bending groove, the cooling air duct blows the cool air to the nylon tube bent in the bending groove, so that the nylon tube can be cooled and formed quickly. Such can avoid slow deformation recovery of the nylon tube when the elbow assembly is loosened, thereby guaranteeing the bending quality of the nylon tube.

According to a further arrangement in a preferred embodiment of the present application, the cut-off device includes a cut-off groove defined in the limiting block, a fixing frame connected outside the limiting block, a cut-off cylinder arranged in the fixing frame and a cutter connected to the end of a piston rod of the cut-off cylinder, wherein the cut-off groove is perpendicular to the circular channel and communicates with the outside of the circular channel and the limiting block, and the cutter is slidably arranged in the cut-off groove.

By adopting the above technical solution, when the piston rod of the cut-off cylinder is ejected out, the cutter is driven to slide towards the circular channel along the cut-off groove, and cut off the nylon tube passing through the circular channel, then the piston rod of the cut-off cylinder is retracted, the nylon tube can be continuously conveyed along the circular channel, achieving the purposes of automatically cutting off the nylon tube, rapid action, high machining efficiency, and good quality.

According to a further arrangement in a preferred embodiment of the present application, an output block is arranged between the electrically heated cylinder and the curved wheel component, a discharge port is arranged on the output block, a clamping port is arranged on the output block perpendicular to the discharge port, wherein the clamping port is communicated with the discharge port, a clamping block is slidably arranged in the clamping port, a clamping cylinder is arranged outside the clamping port, a cylinder block of the clamping cylinder is fixed outside the electrically heated cylinder, and a piston rod abuts against the clamping block.

By adopting the above technical solution, the nylon tube enters the circular channel on the curved wheel component, from the discharge port on the output block, after passing through the electrically heated cylinder. During the rotation of the curved wheel assembly under the driving of the first driving component, the nylon tube may distort due to friction between the circular channel and the nylon tube. The above clamping block and the clamping cylinder are arranged, so that the clamping cylinder drives the clamping block to abut against the nylon tube in the discharge port, when the curved wheel assembly rotates, preventing the nylon tube from rotating and twisting, thereby further guaranteeing the forming quality of the nylon tube.

A second object of the present application is to provide a nylon tube shaping process applying the nylon tube automatic thermoforming apparatus, which has advantageous effects of high forming accuracy and forming efficiency.

The second object of the present application is achieved by the following technical solutions:

There is provided a nylon tube shaping process applying the nylon tube automatic thermoforming apparatus described above, which includes the following process steps of:

S1, drawing, which manually feeds an end of a coiled nylon tube into a conveying assembly, so that the conveying assembly continuously draws the nylon tube;

S2, heating inside a main body, which heats the nylon tube via an oven;

S3, heating outside the main body, which heats the nylon tube outside the main body via an electrically heated cylinder;

S4, bending, which activates a second driving component to rotate an elbow component at an angle and press the nylon tube into a bending groove;

S5, staying, wherein the elbow component maintains the state that the nylon tube is pressed into the bending groove for several seconds;

S6, feeding, wherein the nylon tube moves towards one end of a tube bending assembly by a certain distance;

S7, angle adjusting, which activates a first driving component, and drives a curved wheel component to rotate by a certain angle along the circular channel;

S8, repeating S4-S7 until the length and the curvature of the nylon tube meet the requirements; and S9, cutting off, where the cut-off cylinder is ejected out and retracted to cut off the nylon tube.

By adopting the above technical solution, the nylon tube is heated all the time in the process from the conveying assembly to the tube bending assembly and is easy to reform, therefore, the problem of slow deformation recovery after bending is avoided, a good forming accuracy of the nylon tube can be guaranteed, meanwhile, the whole forming process is all completed by machines, no manual operation process is needed except for the first drawing step. Compared with a traditional process of manually using a mold to mold first and then heat, the machining efficiency is greatly improved, the machining cost is saved and popularization and production are facilitated.

In summary, the present application has at least one of the beneficial effects of as follow:

1. it can be guaranteed that the nylon tube is always in a heated state before entering the tube bending assembly, avoiding the situation that the nylon tube is cooled and hardened and thus hard to form before being bent, and guaranteeing that the nylon tube has good forming accuracy;
2. the degree of automation is high, the machining efficiency is high, the bending radians and angles of the nylon tubes are controlled by the machine, and thus the accuracy is high, and the machined products are stable in quality;
3. after being bent, the nylon tube is cooled and formed quickly via an air cooling system, such can avoid slow deformation recovery of the nylon tube when the elbow assembly is loosened, thereby guaranteeing the bending quality of the nylon tube;
4. when the curved wheel assembly rotates, the clamping cylinder drives the clamping block to abut against the nylon tube in the discharge port, preventing the nylon tube from rotating and twisting, thereby further guaranteeing the forming quality of the nylon tube; and
5. compared with a traditional process of manually using a mold to mold first and then heat, the fully-automated nylon tube shaping process greatly improves the machining efficiency, saves the machining cost and facilitating popularization and production.

DESCRIPTION OF THE EMBODIMENTS

The present application is further illustrated in detail in combination with the accompanying drawings hereinafter.

Embodiment I

Figure 1:
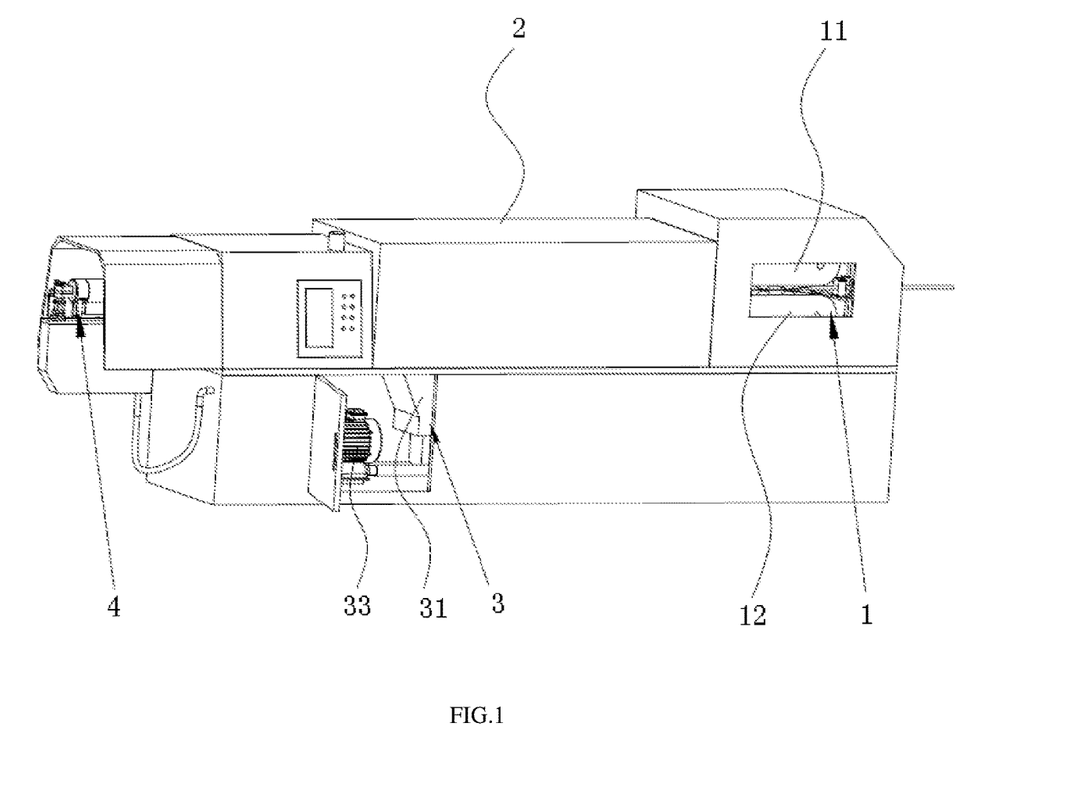
FIG. 1 is an overall schematic structural view of a nylon tube automatic thermoforming apparatus disclosed in Embodiment I of the present application from a first perspective.
Figure 2:
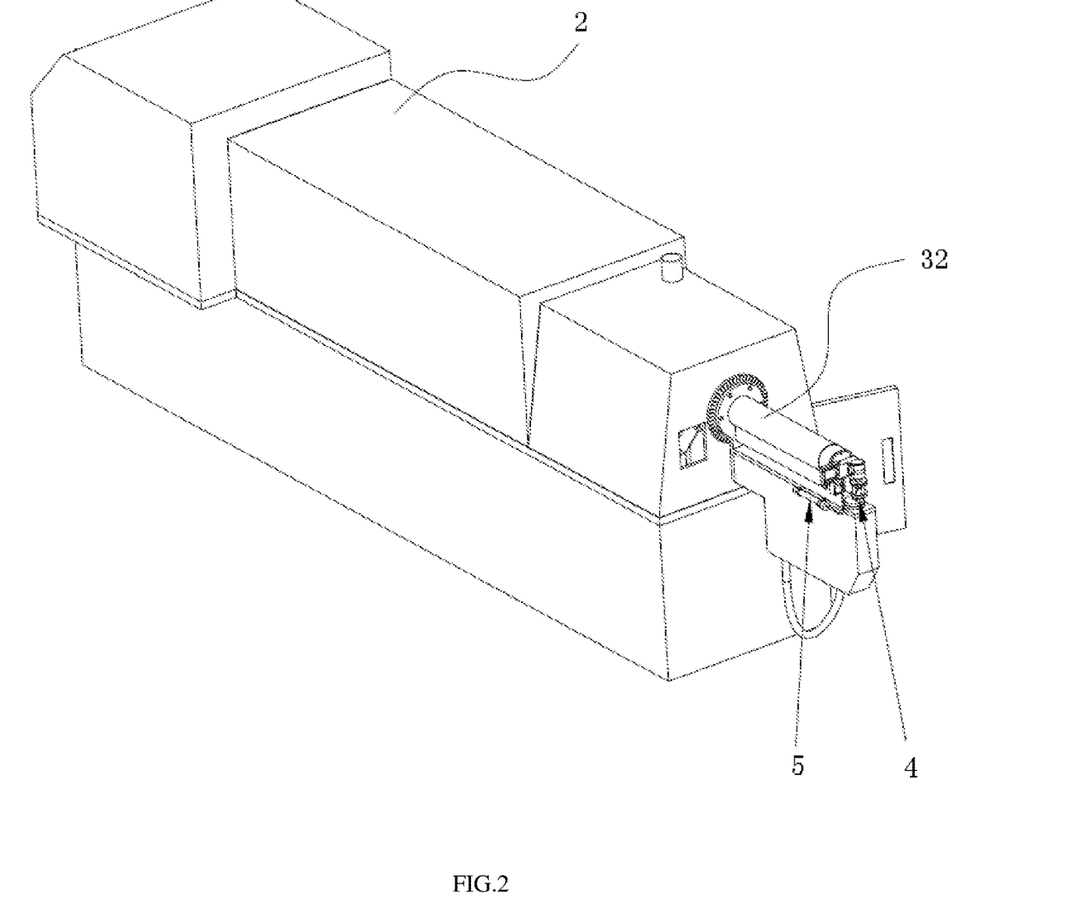
FIG. 2 is an overall schematic structural view of a nylon tube automatic thermoforming apparatus disclosed in Embodiment II of the present application from a second perspective.
Figure 3:
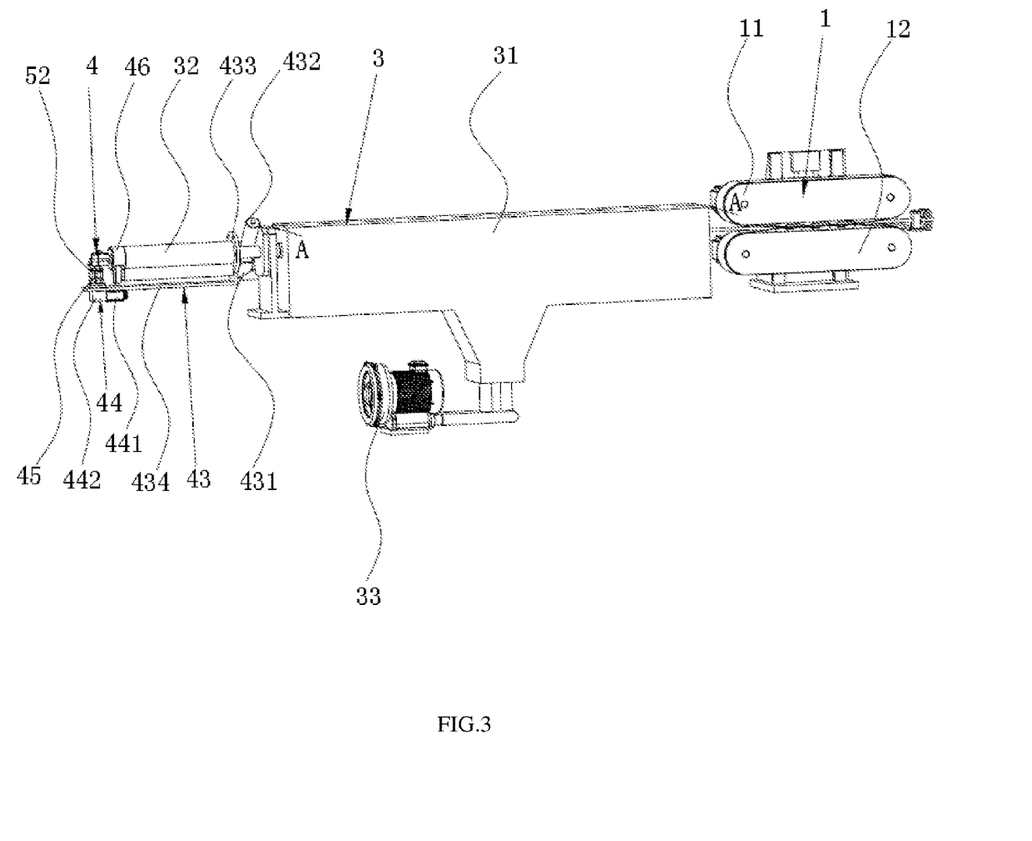
FIG. 3 is a schematic structural view of FIG. 1 with a main body removed.

Referring to FIG. 1 to FIG. 3, which show a nylon tube automatic thermoforming apparatus disclosed in the present application, including a main body 2, and a conveying assembly 1, a heating assembly 3 and a tube bending assembly 4 which are sequentially arranged in the main body 2. The heating assembly 3 includes an oven 31 communicated with the conveying assembly 1 and an electrically heated cylinder 32 arranged between the oven 31 and the tube bending assembly 4. A heating coil is arranged in the electrically heated cylinder 32. A nylon tube is conveyed from the conveying assembly 1 and enters the tube bending assembly 4 via the oven 31 and the electrically heated cylinder 32. The electrically heated cylinder 32 and the tube bending assembly 4 are arranged outside the main body 2. As a part of the heating assembly 3, the electrically heated cylinder 32 can continuously heat the nylon tube outside the main body 2 in the case that the oven 31 does not extend out of the main body 2, which guarantees the nylon tube is always in a heated state before entering the tube bending assembly 4, avoids the situation that the nylon tube is cooled and hardened and thus hard to form before being bent, and guarantees that the nylon tube has good forming accuracy.

An air cooling system 5 that helps the formed nylon tube to be shaped and a cut-off device 6 for cutting a piece of nylon tube off after it is machined are arranged outside the tube bending assembly 4.

Referring to FIG. 3, a conveying assembly 1 includes an upper conveyor belt 11 and a lower conveyor belt 12 horizontally arranged at one end of the main body 2. A channel allowing a nylon tube to penetrate through is formed between the upper conveyor belt 11 and the lower conveyor belt 12. The lower conveyor belt 12 is fixedly arranged, and the upper conveyor belt 11 is vertically slidably arranged on a sidewall of the main body 2, thereby achieving the effect of clamping the nylon tube. The upper conveyor belt 11 moves relative to the lower conveyor belt 12 to achieve the effect of drawing the nylon tube sandwiched between the upper conveyor belt 11 and the lower conveyor belt 12 towards one end of the tube bending assembly 4. Such a structure can continuously draw the nylon tube, leading to high efficiency and low damage to the nylon tube.

Figure 4:
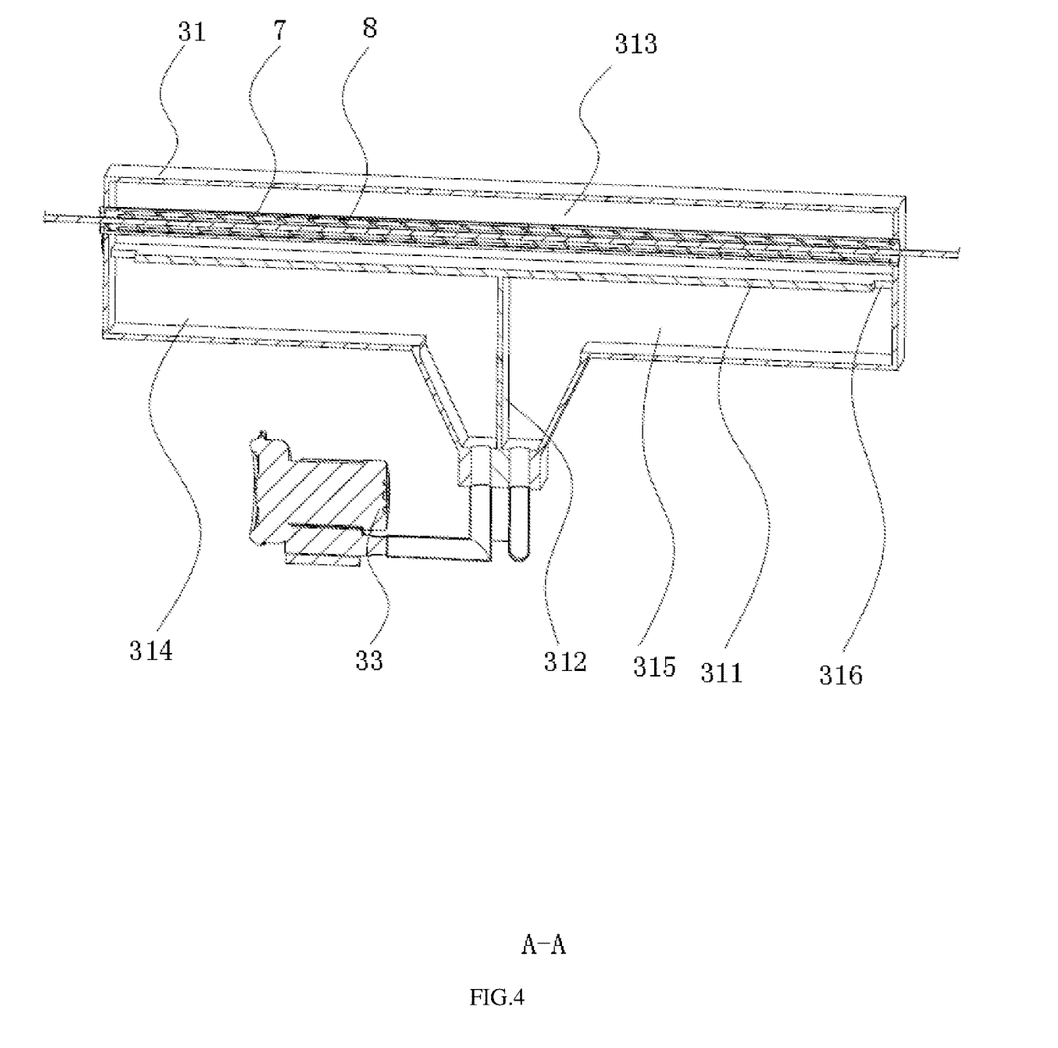
FIG. 4 is a cross-sectional view of an oven portion taken along line A-A in FIG. 3.

Referring to FIG. 4, the oven 31 is fixed with a hollow conveying tube 7 along the length direction thereof, a spring 8 is arranged in the conveying tube 7, and a nylon tube passes through an inner hole of the spring 8. A hot-air blower 33 is connected to the bottom of the oven 31. A horizontal partition plate 311 is arranged inside the oven 31. The horizontal partition plate 311 partitions the interior of the oven 31 into an upper chamber 313 and a lower chamber. Communication ports 316 for communicating the upper chamber 313 with the lower chamber are both arranged on the horizontal partition plate 311 at positions close to the an input end and an output end of the nylon tube. The lower chamber is further arranged with a vertical partition plate 312 for partitioning the lower chamber into a left chamber 314 and a right chamber 315. An air outlet and an air inlet of the hot-air blower 33 are respectively connected to the left chamber 314 and the right chamber 315 at positions close to the vertical partition plate 312 via pipelines. The hot-air blower 33 supplies hot air into the oven 31, and the flowing direction of the hot air is that the hot air enters the left chamber 314 from the air outlet of the hot-air blower 33, then flows in a direction away from the right chamber 315 along the left chamber 314, enters the upper chamber 313 through a communication port 316 at the left end of the horizontal partition plate 311, and flows along the left chamber 314 towards one end of the right chamber 315, and finally, the hot air enters the right chamber 315 through a communication port 316 at the right end of the horizontal partition plate 311 and returns to the air inlet of the blower from a pipeline in the right chamber 315. This achieves purposes of circulating hot air, saving energy, and keeping a constant temperature in the oven 31. In the process of flowing in the oven 31, the hot air heats the nylon tube through the hollow conveying tube 7 and the spring 8. Particularly, the conveying tube 7 plays a role of supporting so that the spring 8 is in a linear extension state and has relatively large and uniform gaps therein, and the contact area between the spring 8 and the nylon tube is small within a unit area so that the nylon tube can be uniformly supported and uniformly heated when being transmitted inside and the quality after forming can be guaranteed.

Figure 5:
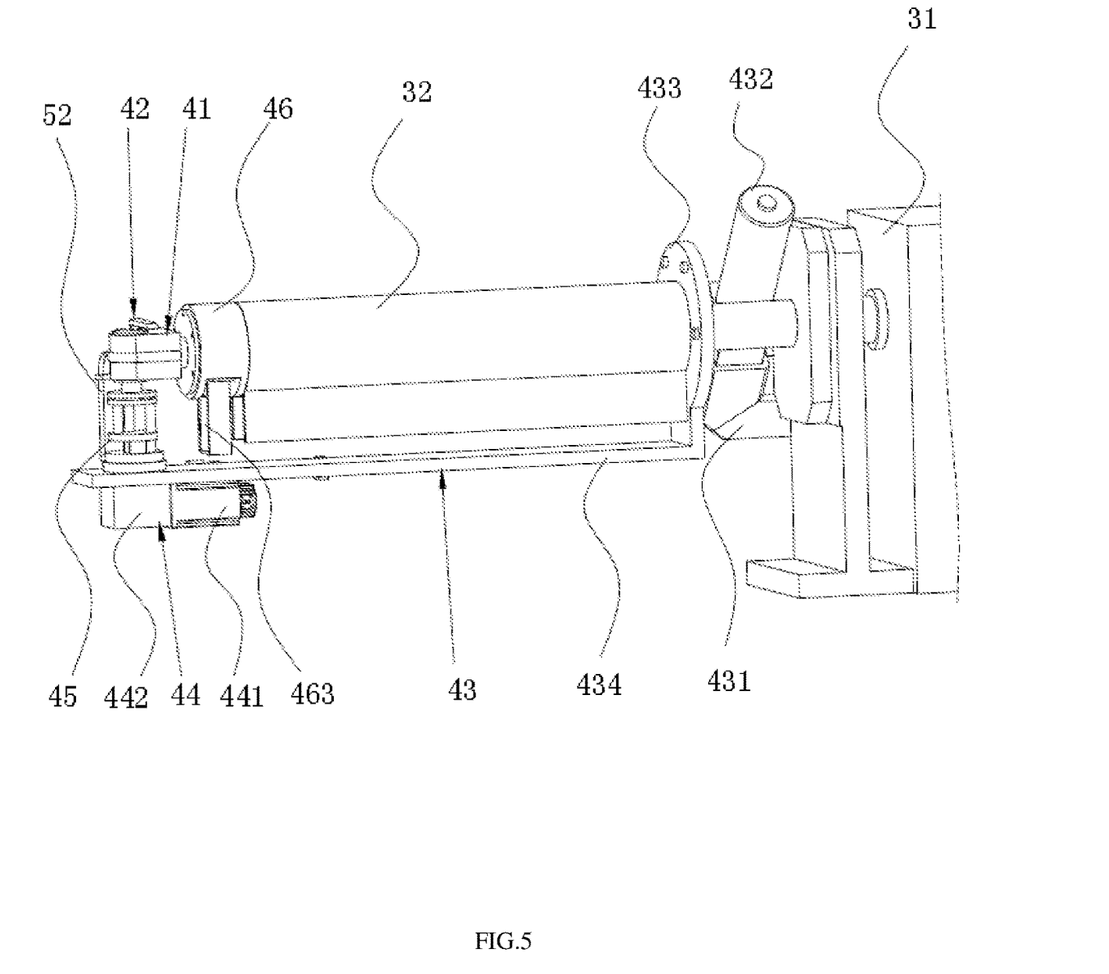
FIG. 5 is a schematic structural view of a tube bending assembly in FIG. 3.
Figure 6:
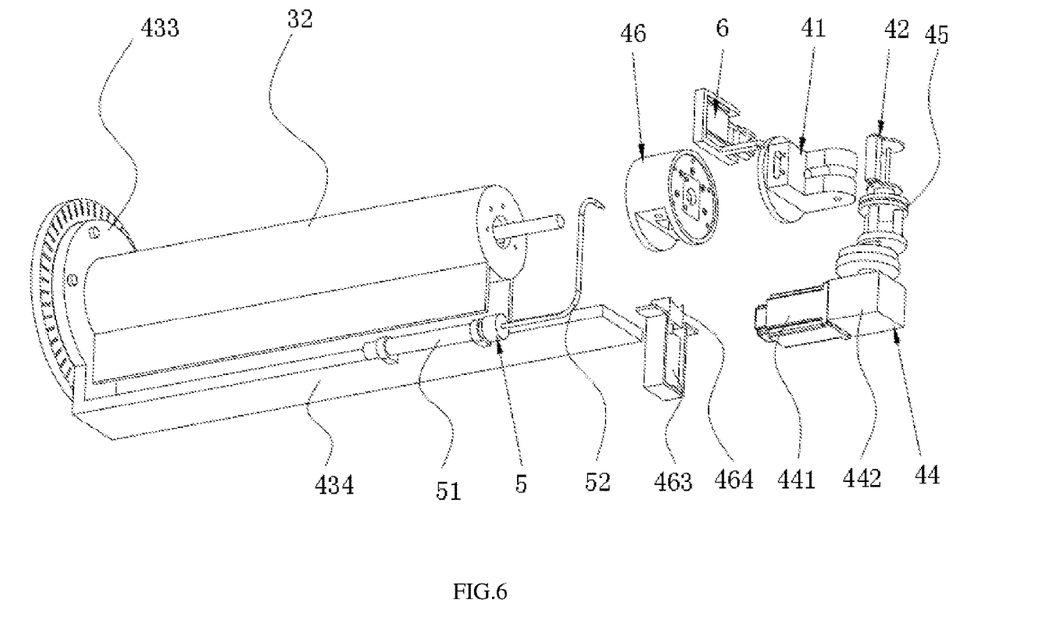
FIG. 6 is a schematic exploded structural view of a tube bending assembly.

Referring to FIG. 5 and FIG. 6, the tube bending assembly 4, which is arranged at an end of the electrically heated cylinder 32 away from the main body 2, includes an output block 46 connected to an end of the heating assembly 3 by bolts, a curved wheel component 41 rotatably connected to the output block 46, a first driving component 43 driving the curved wheel component 41 to rotate, an elbow component 42 rotatably connected to the curved wheel component 41, and a second driving component 44 driving the elbow component 42 to rotate relative to the curved wheel component 41, a discharge port 461 is arranged on the output block 46 coaxially with the electrically heated cylinder 32.

Figure 7:
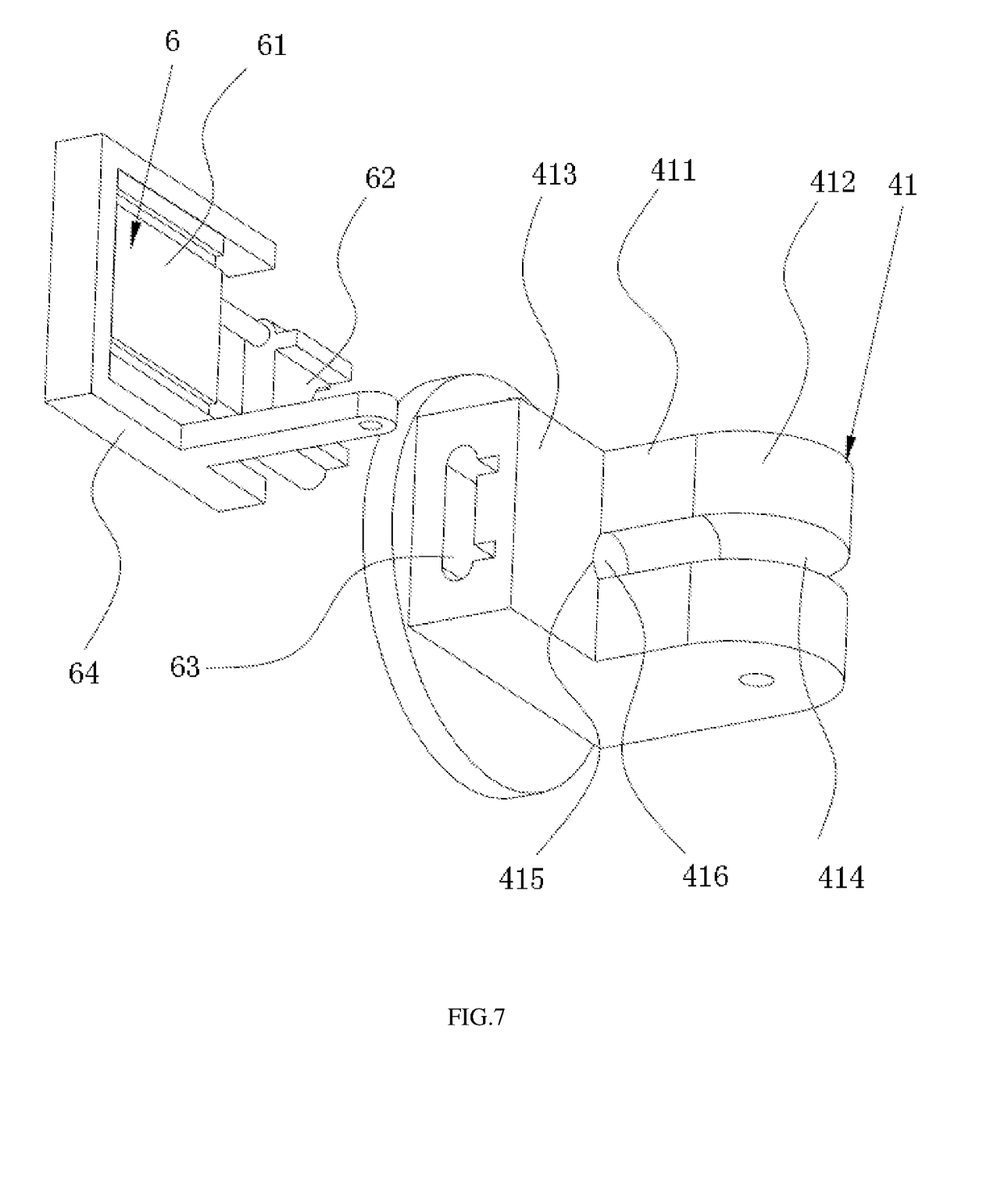
FIG. 7 is a schematic structural view of a curved wheel component and a cut-off device.

Referring to FIG. 5 and FIG. 7, the curved wheel component 41 includes a rectangular block 411, a sector block 412, a limiting block 413 that are integrally connected together. The sector block 412 is arranged at one side of the rectangular block 411. The limiting block 413 is arranged at the other side of the rectangular block 411. A bending groove 414 is defined on the sector block 412 along the arc surface. Two ends of the bending groove 414 extend to two surfaces of the rectangular block 411 and penetrate through the rectangular block 411. A matching groove 415 is defined on one side of the limiting block 413 toward the rectangular block 411. The matching groove 415 and a limiting groove are snap-fitted to form a circular channel 416. One end of the circular channel 416 away from the sector block 412 directly faces the discharge port 461 of the output block 46, and is rotationally connected to the output block 46 centering about a central axis of the circular channel 416. The rectangular block 411, the sector block 412 and the limiting block 413 are formed integrally. The first driving component 43 includes a driving disk 433 rotatably connected to the main body 2, and a cantilever 434 connected to the driving disk 433. The driving disk 433 is coaxially arranged with the central axis of the electrically heated cylinder 32. The cantilever 434 is parallel to the electrically heated cylinder 32. An end of the cantilever 434 away from the main body 2 is connected to the curved wheel component 41. A first servo motor 431 for driving the driving disk 433 to rotate and a first speed reducer 432 are provided inside the main body 2. The first speed reducer 432 in this embodiment of the present application is a planetary gear reducer.

Figure 8:
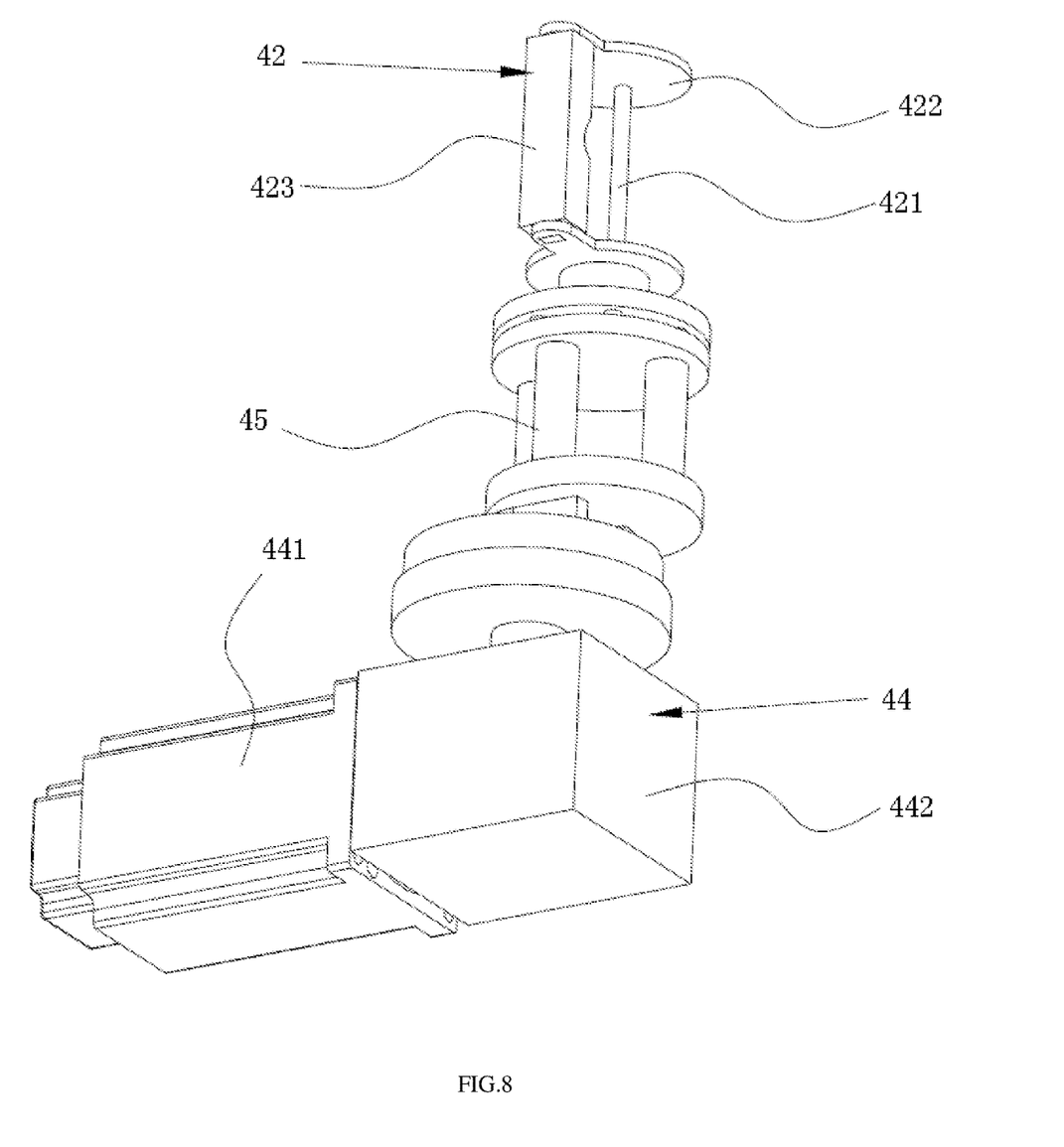
FIG. 8 is a schematic structural view of an elbow component and a second driving component.

Referring to FIG. 6 and FIG. 8, the elbow component 42 includes a rotary shaft 421 penetrating through a circle center of the sector block 412, rotary arms 422 connected to two ends of the rotary shaft 421 and a bending lever 423 connected between the rotary arms 422. The second driving component 44 includes a second servo motor 441 and a second speed reducer 442 arranged on the cantilever 434, and an output shaft of the second speed reducer 442 and the rotary shaft 421 are connected via a shaft coupling 45. The shaft coupling 45 in this embodiment of the present application is a flexible shaft coupling 45 without an elastic element, and the shaft coupling 45 has the capacity of compensating relative displacement between the rotary shaft 421 and the output shaft of the second speed reducer 442. When the tube diameter of the nylon tube changes slightly, compensation can be performed through the shaft coupling 45, guaranteeing the accuracy of the bending tubes and preventing the surface of the nylon tube from being extruded and damaged.

The rotation of the first servo motor 431 is transmitted to the driving disk 433 via a speed reducer. The driving disk 433 drives the cantilever 434 to rotate around the electrically heated cylinder 32. The cantilever 434 in turn drives the curved wheel component 41 to rotate around the circular channel 416 at a certain angle. Then, the second driving component 44 is activated again to drive the elbow component 42 to rotate. The bending direction of the elbow component 42 to the nylon tube is different from that of the first time. Thus, the purpose of bending the nylon tube in different directions can be achieved.

After passing through the electrically heated cylinder 32, the nylon tube enters the circular channel 416 on the curved wheel component 41 from the discharge port 461 on the output block 46 and extends out from the circular channel 416. An elbow component 42 is rotated about a circle center of the sector block 412 under the driving of the second driving component 44, thereby pressing the nylon tube portion extending out of the circular channel 416 into the bending groove 414. When the nylon tube needs to be bent in different directions to generate radian, a first driving motor can be activated to drive the driving disk 433 and a cantilever 434 to rotate, and meanwhile, the second driving component 44 connected to the cantilever 434 is also rotated together. When the second driving component 44 is rotated to a suitable angle, the second servo motor 441 is activated. The rotation of the second servo motor 441 is transmitted to the shaft coupling 45 via a speed reducer. The shaft coupling 45 transmits the rotational movement to the rotary shaft 421. The rotary shaft 421 drives the rotary arm 422 to rotate. The rotary arm 422 in turn drives the bending lever 423 to rotate centering about the rotary shaft 421. That is, the bending lever 423 rotates along the bending groove 414 about the circle center of the sector block 412, the rotation of the bending lever 423 urges the nylon tube protruding from the circular channel 416 to bend and press into the bending groove 414. Therefore, bending of the nylon tube is achieved for the first time. Thereafter, the first driving component drives the curved wheel component 41 again to rotate along the circular channel 416 to a corresponding angle, and then the second driving component 44 is activated again to bend the nylon tube, thereby forming a final desired product with high machining accuracy and high machining efficiency.

Figure 9:
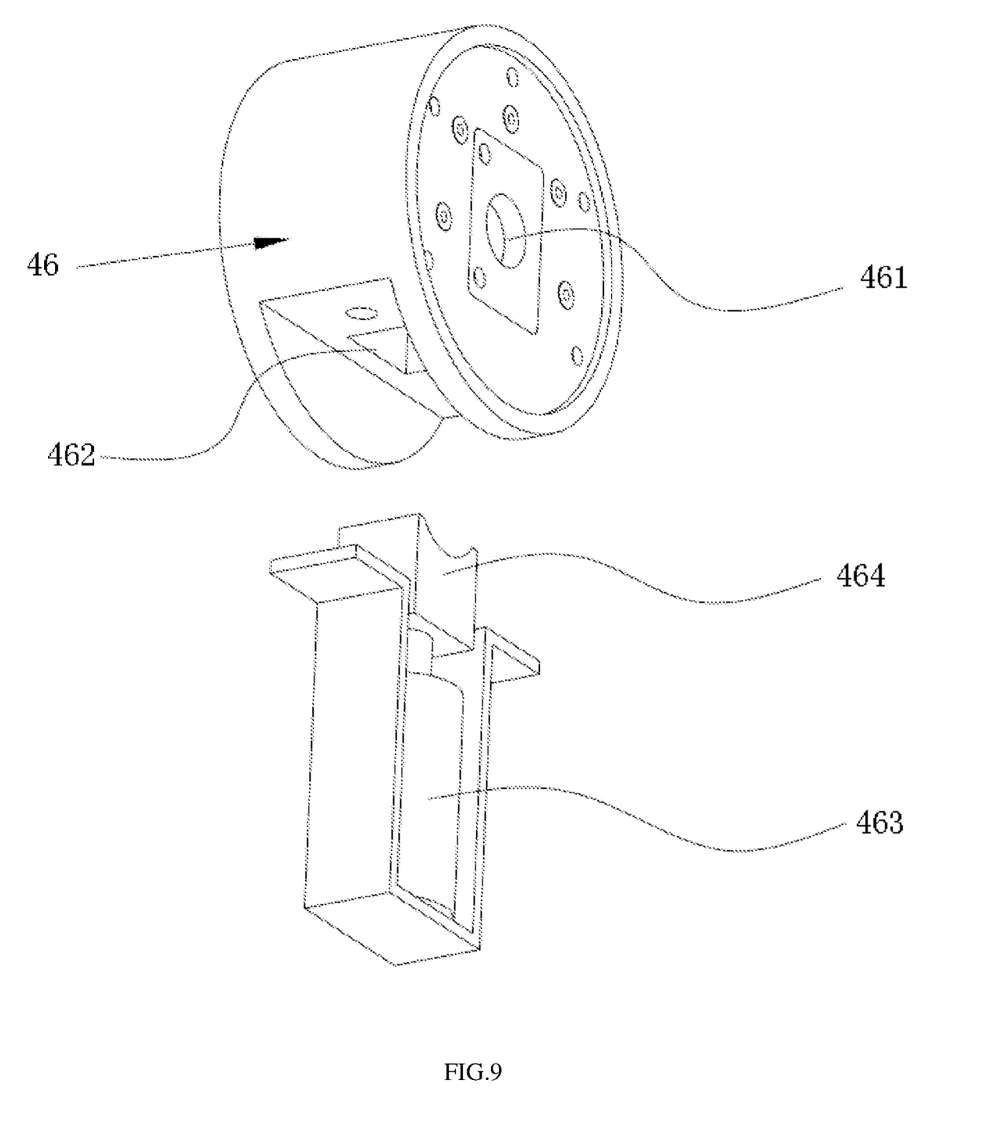
FIG. 9 is a schematic structural view of an output block and various members for clamping.

Referring to FIG. 6 and FIG. 9, the nylon tube enters the circular channel 416 on the curved wheel component 41, from the discharge port 461 on the output block 46, after passing through the electrically heated cylinder 32. During the rotation of the curved wheel component 41 under the driving of the first driving component 43, The nylon tube may distort due to friction between the circular channel 416 and the nylon tube. In order to solve the above problem, In this embodiment of the present application, the clamping port 462 is communicated with the discharge port 461, a clamping block 464 is slidably arranged in the clamping port 462, a clamping cylinder 463 is arranged outside the clamping port 462, a cylinder block of the clamping cylinder 463 is fixed outside the electrically heated cylinder 32, and a piston rod abuts against the clamping block 464 and is connected with the clamping block 464. When the curved wheel component 41 rotates, the clamping cylinder 463 drives the clamping block 464 to abut against the nylon tube in the discharge port 461, preventing the nylon tube from rotating and twisting, thereby further guaranteeing the forming quality of the nylon tube.

Referring to FIG. 7, the cut-off device 6 includes a cut-off groove 63 defined in the limiting block 413, a fixing frame 64 connected outside the limiting block 413, a cut-off cylinder 61 arranged in the fixing frame 64 and a cutter 62 connected to the end of a piston rod of the cut-off cylinder 61, wherein the cut-off groove 63 is perpendicular to the circular channel 416 and communicates with the outside of the circular channel 416 and the limiting block 413, and the cutter 62 is slidably arranged in the cut-off groove 63. When the piston rod of the cut-off cylinder 61 is ejected out, the cutter 62 is driven to slide towards the circular channel 416 along the cut-off groove 63, and cut off the nylon tube passing through the circular channel 416, then the piston rod of the cut-off cylinder 61 is retracted, the nylon tube can be continuously conveyed along the circular channel 416, achieving the purposes of automatically cutting off the nylon tube, rapid action, high machining efficiency, and good quality.

Referring to FIG. 6, the air cooling system 5 includes a cooler 51 arranged on the cantilever 434 and a cooling air duct 52 connected to the cooler 51, wherein, an end portion of the cooling air duct 52 directly faces the bending groove 414. The cooler 51 generates cool air and blows the cold air to the bending groove 414 through the cooling air duct 52, and when the nylon tube is pressed into the bending groove 414, the cooling air duct 52 blows the cool air to the nylon tube bent in the bending groove 414, so that the nylon tube can be cooled and formed quickly. Such can avoid slow deformation recovery of the nylon tube when the elbow component 42 is loosened, thereby guaranteeing the bending quality of the nylon tube.

The implementation principle of the nylon tube automatic thermoforming apparatus is that: firstly, a program is programmed according to product requirements, and then input into the control system of the machine, the nylon tube is then conveyed on the lower conveyor belt 12, the upper conveyor belt 11 is driven to be lowered to sandwich the nylon tube between the two. Along with the opposite conveying of the upper conveyor belt 11 and the lower conveyor belt 12, the nylon tube is continuously drawn forward, enters in the middle of the spring 8 of the oven 31, extends forwardly along the spring 8 into the electrically heated cylinder 32, and enters the circular channel 416 from the discharge port 461 on the output block 46 at the ends of the electrically heated cylinder 32. The tube bending assembly 4 performs a tube bending operation according to the program, to bend the nylon tube in a plurality of dimensions. Finally, the cut-off cylinder 61 performs a cut-off operation according to the program, to complete a bending operation of one nylon tube. The above steps are continued, to perform continuous tube bending operations. The nylon tube is always in a heated state before being bent, so that the nylon tube can be formed easily. The air cooling system 5 performs timely air cooling on the bent nylon tube portion, so that the nylon tube can be cooled and formed quickly, thereby avoiding slow deformation, the bending accuracy is high, and the machined products are stable in quality; the whole process is performed by a machine, the degree of automation is high, and the machining efficiency is high.

Embodiment II

Figure 10:
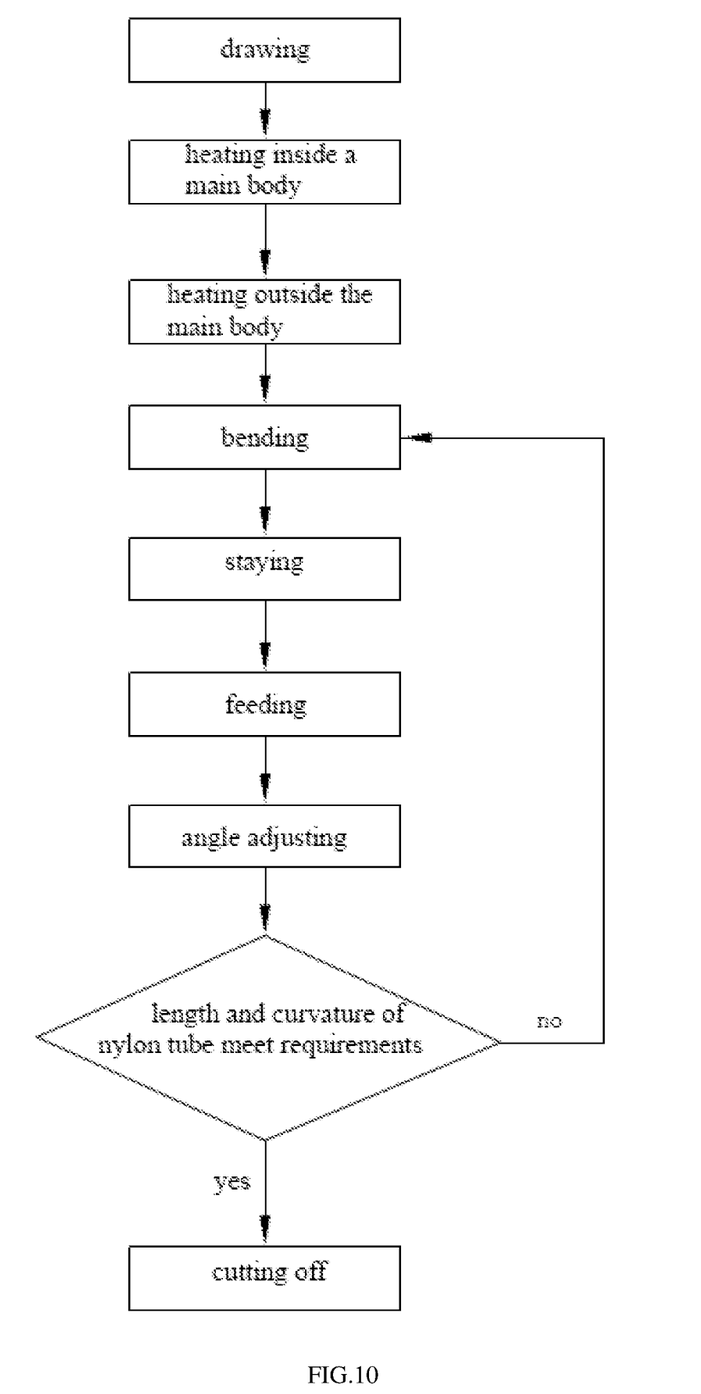
FIG. 10 is a flow chart of a nylon tube shaping process disclosed in Embodiment II of the present application.

Referring to FIG. 10, this embodiment of the present application discloses a nylon tube shaping process applying the nylon tube automatic thermoforming apparatus in Embodiment I, which includes the following process steps of:
  S1, drawing, which manually feeds an end of a coiled nylon tube into a conveying assembly 1 between an upper conveyor belt 11 and a lower conveyor belt 12, so that the conveying assembly 1 continuously draws the nylon tube;
  S2, heating inside a main body 2, which heats the nylon tube via an oven 31;
  S3, heating outside the main body 2, which heats the nylon tube outside the main body 2 via an electrically heated cylinder 32;
  S4, bending, which activates a second driving component 44 to rotate an elbow component 42 at an angle and press the nylon tube into a bending groove 414;

S5, staying, wherein the elbow component 42 maintains the state that the nylon tube is pressed into the bending groove 414 for several seconds;

S6, feeding, wherein the nylon tube moves towards one end of a tube bending assembly 4 by a certain distance;

S7, angle adjusting, which activates a first driving component 43, and drives a curved wheel component 41 to rotate by a certain angle along the circular channel 416;

S8, repeating S4-S7 until the length and the curvature of the nylon tube meet the requirements; and S9, cutting off, where the cut-off cylinder 61 is ejected out and retracted to cut off the nylon tube.

The nylon tube is heated all the time in the process from the conveying assembly 1 to the tube bending assembly 4 and is easy to reform, therefore, the problem of slow deformation recovery after bending is avoided, a good forming accuracy of the nylon tube can be guaranteed, meanwhile, the whole forming process is all completed by machines, no manual operation process is needed except for the first drawing step. Compared with a traditional process of manually using a mold to mold first and then heat, the process in the present application greatly improves the machining efficiency, saves the machining cost and facilitating popularization and production.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A nylon tube automatic thermoforming apparatus, comprising a main body, a conveying assembly, a heating assembly and a tube bending assembly, wherein, the heating assembly comprises an oven communicated with the conveying assembly and an electrically heated cylinder arranged between the oven and the tube bending assembly, a heating coil is arranged in the electrically heated cylinder, a nylon tube is conveyed from the conveying assembly and enters the tube bending assembly via the oven and the heating coil, the electrically heated cylinder and the tube bending assembly are arranged outside the main body, and an air cooling system and a cut-off device are arranged outside the tube bending assembly, wherein the tube bending assembly, which is arranged at an end of the electrically heated cylinder away from the main body, comprises a curved wheel component rotatably connected to the electrically heated cylinder, a first driving component driving the curved wheel component to rotate, an elbow component rotatably connected to the curved wheel component, and a second driving component driving the elbow component to rotate relative to the curved wheel component;

the curved wheel component comprises a rectangular block, a sector block, a limiting block that are integrally connected together, the sector block is arranged at a first side of the rectangular block, the limiting block is arranged at a second side of the rectangular block, a bending groove is defined on the sector block along an arc surface, two ends of the bending groove extend to two surfaces of the rectangular block and penetrate through the rectangular block, a matching groove is defined on one side of the limiting block toward the rectangular block, the matching groove and a limiting groove are snap-fitted to form a circular channel, one end of the circular channel away from the sector block directly faces an outlet of the electrically heated cylinder, and is rotationally connected centering about a central axis of the circular channel, and a rotational circle center of the elbow assembly coincides with a circle center of a sector surface of the sector block.

2. The nylon tube automatic thermoforming apparatus according to claim 1, wherein the elbow assembly comprises a rotary shaft penetrating through a circle center of the sector block, rotary arms connected to two ends of the rotary shaft and a bending lever connected between the rotary arms, and the second driving component drives the rotary shaft to rotate.

3. The nylon tube automatic thermoforming apparatus according to claim 2, wherein the first driving component comprises a driving disk rotatably connected to the main body, and a cantilever connected to the driving disk, the driving disk is coaxially arranged with the central axis of the electrically heated cylinder, the cantilever is parallel to the electrically heated cylinder, an end of the cantilever away from the main body is connected to the curved wheel component, a first servo motor for driving the driving disk to rotate and a first speed reducer are provided inside the main body.

4. The nylon tube automatic thermoforming apparatus according to claim 3, wherein the second driving component comprises a second servo motor and a second speed reducer arranged on the cantilever, and an output shaft of the second speed reducer and the rotary shaft are connected via a shaft coupling.

5. The nylon tube automatic thermoforming apparatus according to claim 3, wherein the air cooling system comprises a cooler arranged on the cantilever and a cooling air duct connected to the cooler, and an end portion of the cooling air duct directly faces the bending groove.

6. The nylon tube automatic thermoforming apparatus according to claim 1, wherein the cut-off device comprises a cut-off groove defined in the limiting block, a fixing frame connected outside the limiting block, a cut-off cylinder arranged in the fixing frame and a cutter connected to the end of a piston rod of the cut-off cylinder, the cut-off groove is perpendicular to the circular channel and communicates with the outside of the circular channel and the limiting block, and the cutter is slidably arranged in the cut-off groove.

7. The nylon tube automatic thermoforming apparatus according to claim 1, wherein an output block is arranged between the electrically heated cylinder and the curved wheel component, a discharge port is arranged on the output block, a clamping port is arranged on the output block perpendicular to the discharge port, the clamping port is communicated with the discharge port, a clamping block is slidably arranged in the clamping port, a clamping cylinder is arranged outside the clamping port, a cylinder block of the clamping cylinder is fixed outside the electrically heated cylinder, and a piston rod abuts against the clamping block.

8. A nylon tube shaping process applying the nylon tube automatic thermoforming apparatus of claim 1, comprising the following process steps of:

S1, drawing, which manually feeds an end of a coiled nylon tube into the conveying assembly, so that the conveying assembly continuously draws the coiled nylon tube;

S2, heating inside the main body, which heats the nylon tube via an oven;

S3, heating outside the main body, which heats the coiled nylon tube outside the main body via the electrically heated cylinder;

S4, bending, which activates the second driving component to rotate the elbow component at an angle and press the coiled nylon tube into a bending groove;

S5, staying, wherein the elbow component maintains the state that the coiled nylon tube is pressed into the bending groove for several seconds;

S6, feeding, wherein the nylon tube moves towards one end of the tube bending assembly by a certain distance;

S7, angle adjusting, which activates the first driving component, and drives the curved wheel component to rotate by a certain angle along the circular channel;

S8, repeating S4-S7 until the length and the curvature of the coiled nylon tube meet the requirements; and S9, cutting off, where the cut-off cylinder is ejected out and retracted to cut off the coiled nylon tube.

* * * * *